United States Patent [19]

Brindöpke et al.

[11] Patent Number: 4,930,687

[45] Date of Patent: Jun. 5, 1990

[54] DECANTER WITH ATTACHED SPOUT-HANDLE AND METHOD OF MAKING SAME

[75] Inventors: Dieter Brindöpke, Minden; Heiko Rieken, Bad Salzuflen, both of Fed. Rep. of Germany

[73] Assignee: Melitta-Werke Bentz & Sohn, Minden, Fed. Rep. of Germany

[21] Appl. No.: 274,818

[22] Filed: Nov. 22, 1988

[51] Int. Cl.⁵ ............................................. A47G 19/14
[52] U.S. Cl. ................................. 222/475.1; 285/331
[58] Field of Search ........................... 285/317, 331; 222/465.1, 475.1, 566, 570, 153

[56] References Cited

U.S. PATENT DOCUMENTS

| | | |
|---|---|---|
| 332,754 | 12/1885 | Scott . |
| 1,463,692 | 7/1923 | Hail . |
| 2,314,328 | 3/1943 | Enderle . |
| 3,308,982 | 3/1967 | Kitabayashi . |
| 3,473,833 | 10/1969 | Bremer . |
| 3,491,924 | 1/1970 | Bloomfield et al. ............... 222/567 |
| 3,744,824 | 7/1973 | Roos .................................. 285/317 |
| 3,784,235 | 1/1974 | Kessler et al. ..................... 285/21 |
| 3,800,988 | 4/1974 | Karlen et al. ..................... 222/465 |
| 4,090,648 | 5/1978 | Roberts ............................. 222/570 |
| 4,819,972 | 4/1989 | Champe et al. .................. 285/331 |
| 4,838,463 | 6/1989 | Roberts ........................... 222/465.1 |

FOREIGN PATENT DOCUMENTS

| | | |
|---|---|---|
| 1078580 | 11/1954 | France . |
| 392170 | 9/1965 | Switzerland ................... 285/331 |
| 1486671 | 9/1977 | United Kingdom ........... 285/331 |
| 1529141 | 10/1978 | United Kingdom ........... 222/475.1 |

Primary Examiner—Michael S. Huppert
Attorney, Agent, or Firm—Jacob Trachtman

[57] ABSTRACT

Decanter with attached spout-handle comprising a glass carafe having a neck portion with an upstanding ledge providing an opening thereinto, a spout-handle having an annular cavity loosely receiving the ledge of the carafe therein, and a plurality of attachment elements securely received within the cavity of the spout-handle and engaging the ledge of the carafe for interlocking and securing the spout-handle with the carafe about its opening. A flexible material is received within the cavity of the spout-handle for sealing against leakage the spout-handle with the carafe. The attachment element comprise a plurality of spring clip elements at spaced locations about the opening of the carafe, each being a spring metal strip having a substantially V configuration with first and second legs joined at a rounded center portion which is positioned over and secured with the ledge of the carafe, with the legs being on opposite sides of the ledge. The cavity of the spout-handle provides opposite surfaces and each of the legs of the spring clip elements engages an opposite respective surface for securing the clip element and the spout-handle with the carafe.

17 Claims, 3 Drawing Sheets

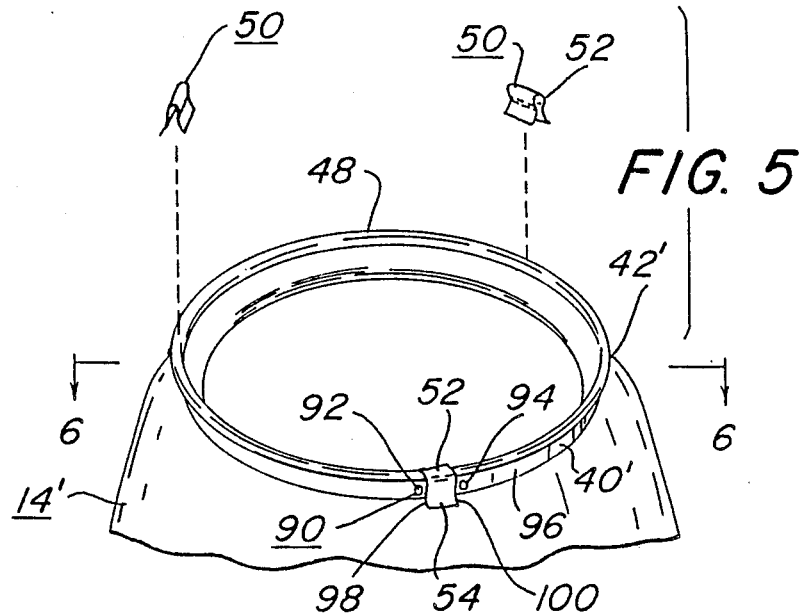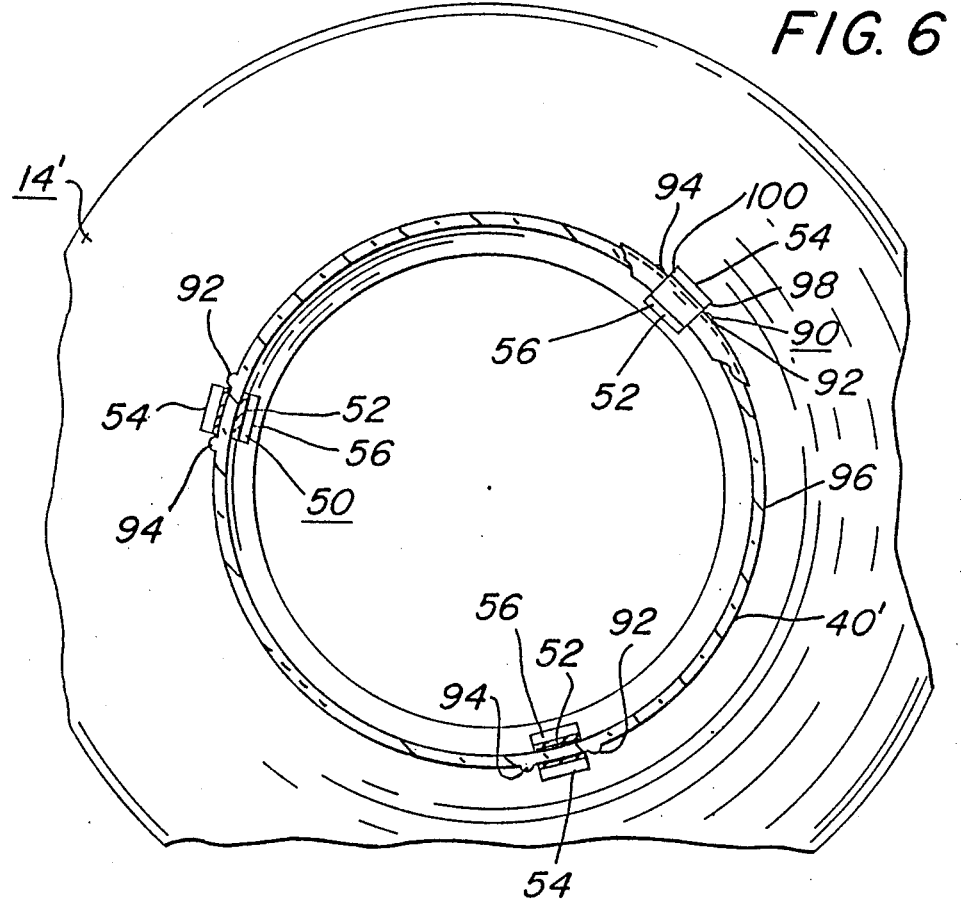

DECANTER WITH ATTACHED SPOUT-HANDLE AND METHOD OF MAKING SAME

BACKGROUND OF INVENTION

The invention relates to a decanter with attached spout-handle, more particularly to a decanter comprising a glass carafe to which a spout-handle is attached by a plurality of attachment means secured within a cavity of the spout-handle and to the upstanding ledge of the neck portion of the glass carafe.

SUMMARY OF THE INVENTION

Heretofore, decanters have been provided with a glass carafe having secured thereto a handle by utilizing a metal band attaching the handle with the neck or the carafe. Such construction must take into account the differences of expansion and contraction of the band and the carafe with the heating of the carafe and its contents and provides a structure which is difficult to assemble. In another form, a decanter has been provided in which the neck portion of the glass carafe is retained by a flexible adhesive material within an annular cavity of a spout-handle completely surrounding the neck portion of the carafe as disclosed in U.S. Pat. No. 4,090,648 of M. F. Roberts. Since the spout-handle portion and carafe are secured only by the adhesive material which may soften and become deformed by the application of heat, it is desirable to provide an interlocking means between the glass carafe and handle for securing them together and provide a secure connection which will not be affected by such softening and deformation caused by heat.

It is therefore a principal object of the invention to provide a new and improved decanter in which a spout-handle is securely attached with a glass carafe while allowing for expansion and contraction of the carafe with changes in temperature.

Another object of the invention is to provide a new and improved decanter in which a spout-handle is securely attached to a glass carafe, allows for expansion and contraction with changes in temperature and prevents detachment of the spout-handle when stressed under high temperature conditions.

Another object of the invention is to provide a new and improved decanter which comprises a minimum number of components and in which a spout-handle may be readily attached to a glass carafe for securely attaching same and accommodating variations in temperature.

Another object of the invention is to provide a new and improved decanter having a spout-handle securely attached with the ledge of a glass carafe by a plurality of attachment means received around the ledge of the carafe for preventing dislodgment of the handle means with respect to the carafe with variations of temperature.

Another object of the invention is to provide a new and improved decanter having interlocking means for securely attaching and sealing a spout-handle with a glass carafe while accommodating for variations in temperature.

Another object of the invention is to provide a new and improved decanter which is rugged in construction, easily assembled, reliable in use and inexpensive to produce.

Still other objects, features and advantages of the invention will be apparent to those skilled in the art from the following detailed description, taken together with the accompanying drawing and appended claims.

The above objects, as well as many others, are achieved by providing a decanter with attached spout-handle comprising a glass carafe having a neck portion with an upstanding ledge providing an opening to the carafe, and a spout-handle having an annular cavity for loosely receiving the ledge of the carafe therein. A plurality of attachment means are securely received within the cavity of the spout-handle and engage the ledge of the carafe for interlocking and resiliently securing together the spout-handle with the carafe about its opening. A flexible material is received within the cavity of the spout-handle for sealing against leakage, the spout-handle with the carafe.

The plurality of attachment means comprises a plurality of spring clip elements each of a spring metal strip having a substantially V configuration with first and second legs joined at a rounded center portion. The clip elements are each positioned over and secured with the ledge of the carafe with their legs on opposite sides of the ledge and at spaced locations about the opening of the carafe. The cavity of the spout-handle provides opposite surfaces and each of the legs of the spring clip elements engages an opposite respective surface for securing the spout-handle with the carafe. At least one of the surfaces of the opposite surfaces of the cavity of the spout-handle may be provided with a ridge, while the ends of the legs of the spring clip elements have an edge for engaging the ridge and firmly securing the clip element with the spout-handle. The upstanding ledge of the carafe has a bead edge, while the center portion of each of the spring elements has a curved configuration for receiving the bead edge therein, so that the legs of each of the spring elements upon being pressed together when received within the cavity of the spout-handle secure the center portion of the spring clip element about the bead edge of the carafe for firmly retaining same therewithin and securely engaging the legs of the spring clip element with the spout-handle. In another form, the opposite surfaces of the cavity of the spout-handle may each be provided with a plurality of adjacent ridges which form intermediate grooves for receiving therein the edges of the legs of each of the spring elements for firmly securing the clip elements within the spout-handle and interlocking the spout-handle with the neck of the carafe so that the carafe is positioned and securely retained within the cavity of the spout-handle.

The neck portion of the carafe may also be provided with positioning means for engaging and retaining the spring clip elements at spaced locations about the opening of the carafe. The positioning means may comprise projections from the ledge of the neck portion for engaging and retaining each of the clip elements and preventing their displacement along the ledge and about the opening of the carafe.

For the purpose of sealing the spout-handle with the neck portion of the carafe, a resilient material is provided within the annular groove of the spout-handle encompassing the neck of the carafe and the attachment means.

The invention also includes a method of forming a decanter utilizing a glass carafe having a neck portion with an upstanding ledge and a spout-handle having an annular cavity for loosely receiving the neck portion of the carafe therein including, positioning a plurality of spring clip elements over and spaced about the upstanding ledge of the neck of a glass carafe, applying a fluid resilient sealing material within the annular cavity of a spout-handle for the glass carafe, inserting the spring clip elements while about the neck of the carafe into the annular cavity of the spout-handle and into engagement with the opposite surfaces of the annular cavity, so that the neck of the carafe is received into and positioned within the cavity and interlocked by the clip elements with the spout-handle, and the resilient sealing material encompasses the neck of the carafe, and allowing the sealing material to solidify and provide a resilient liquid-seal between the spout-handle and carafe.

BRIEF DESCRIPTION OF THE DRAWING

The foregoing and other objects of the invention will become more apparent as the following detailed description of the invention is read in conjunction with the drawing, in which:

FIG. 5 is a perspective view of a modified form of the top portion o& a glass carafe and its attachment means, and FIG. 6 is an enlarged sectional view with portions broken away taken on line 6—6 of FIG. 5.

DETAILED DESCRIPTION

Figure 1:
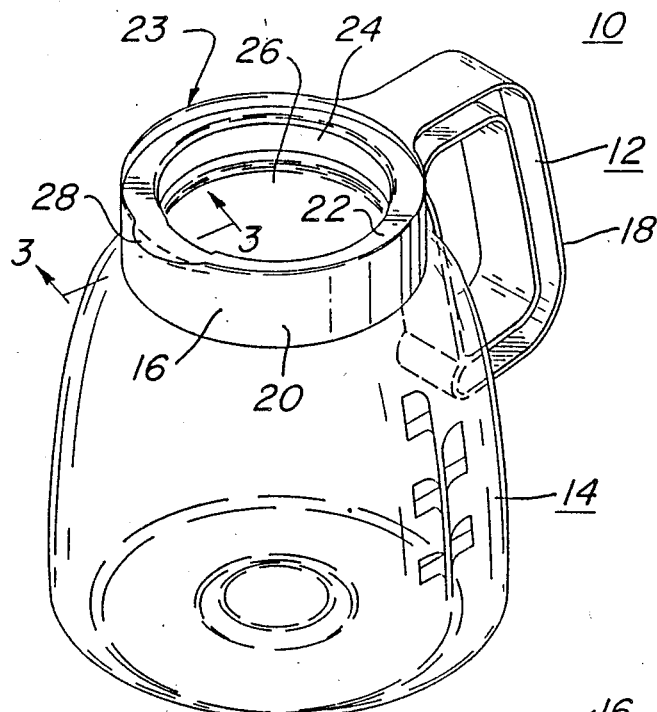
FIG. 1 is a perspective view of a decanter embodying the invention.
Figure 2:
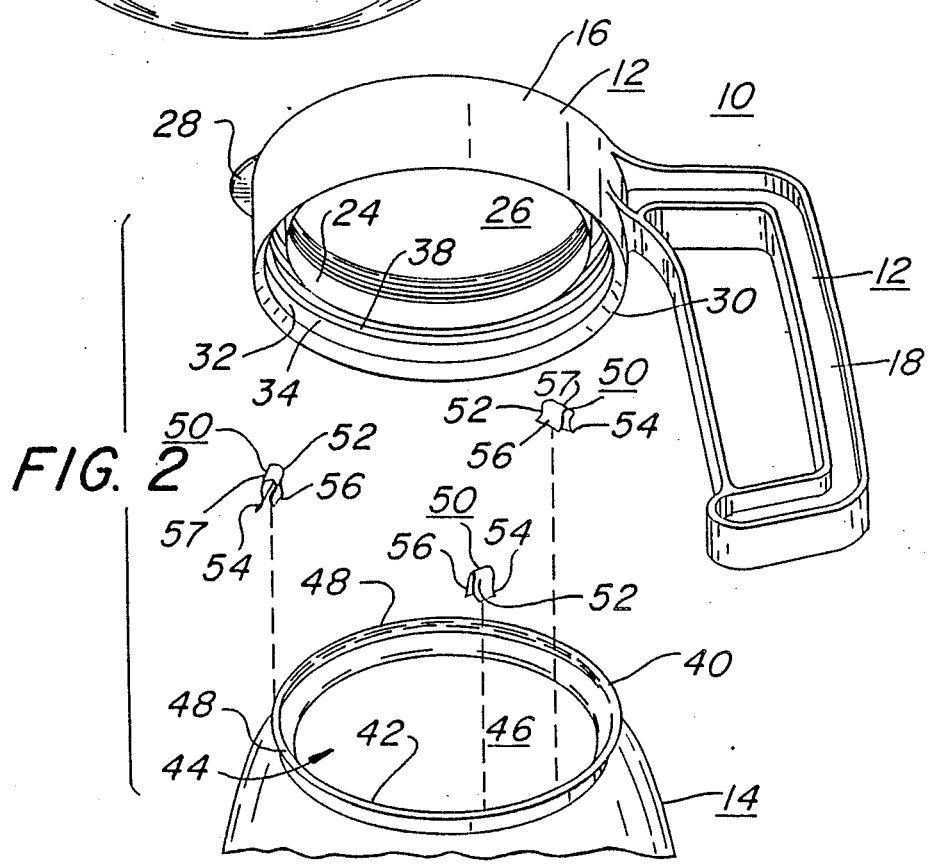
FIG. 2 is an exploded view showing the spout-handle, carafe and attachment means prior to their assembly.
Figure 3:
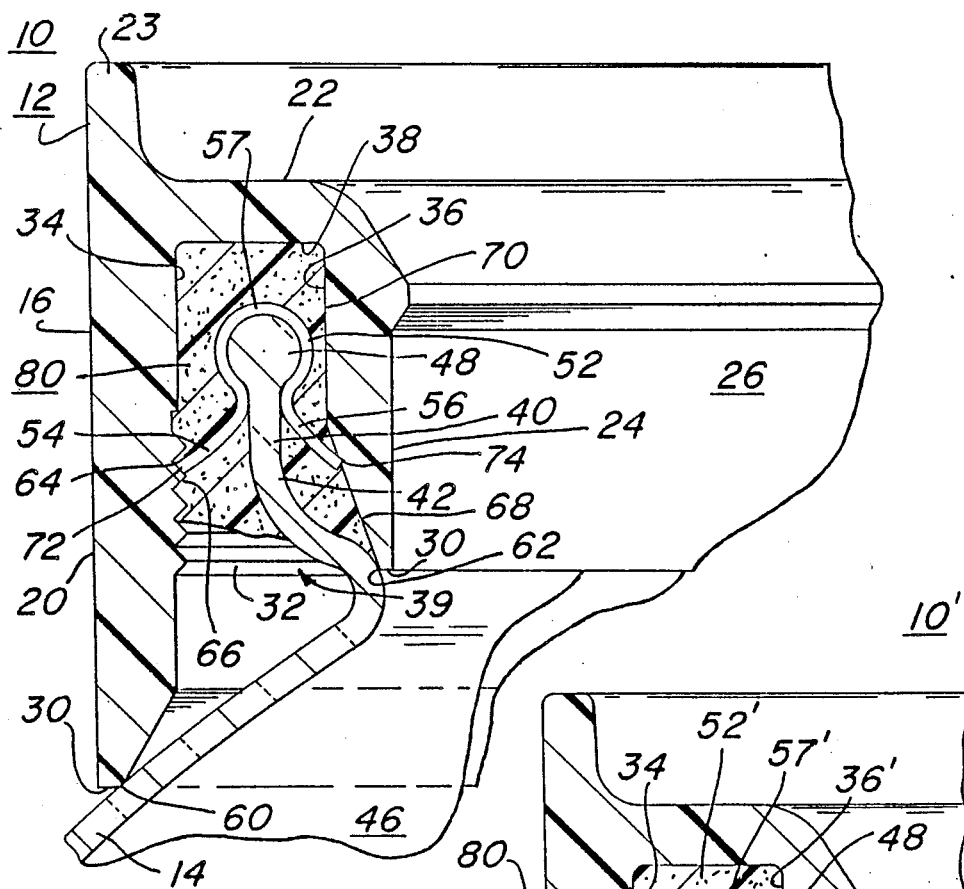
FIG. 3 is an enlarged sectional view with portions broken away taken on the line 3—3 of FIG. 1.

FIGS. 1 to 3 of the drawing illustrate a decanter 10 embodying the invention. The decanter !0 comprises a spout-handle 12 made preferably of a plastic material resistant to heat and a glass carafe 14. The spout-handle 12 has a cylindrical portion 16 for attachment with the carafe 14 and a handle 18 extending outwardly from one side of the cylindrical portion 16 and downwardly. The cylindrical portion 16 has a cylindrical sidewall 20, a top surface 22 and an inner cylindrical surface 24 defining an opening 26. A lip 28 extends from the cylindrical surface 20 and the top surface 22 at a location opposite the handle portion 18. The top surface 22 has a raised peripheral ledge 23 for receiving and retaining a lid (not shown) for enclosing the opening 26. The underside 30 of the cylindrical portion 16 of the spout-handle 12, has an annular cavity 32 as seen in FIGS. 2 and 3. The annular cavity 32 is defined by opposite outer and inner surfaces 34, 36 and a top surface 38 and an entrance 39. The cavity 32 is dimensioned to freely receive therein the upstanding ledge 40 (FIGS. 2 and 3) of the neck portion 42 of carafe 14.

The carafe 14 is preferably made of glass suitable for containing heated substances such as coffee and dispensing same through the spout-handle 12. The neck portion 42 with its upstanding ledge 40 provides an opening 44 into the cavity 46 of the carafe 14. The upstanding ledge 40 extends upwardly and is terminated by an annular bead 48 at its top.

A plurality of fastening means 50 comprising metal spring clip elements 52 are received over the upstanding ledge 40 at spaced locations about the opening 44 of the carafe 14. Each of the spring clip elements 52 is provided by a resilient metal strip having a substantially V configuration with opposite first and second legs 54, 56 joined by a curved center portion 57. When in position over the ledge 40, the leg 54 of a spring clip 52 extends outside the neck portion 42 of the carafe 14, while its leg 56 which is shorter than leg 54 extends within the neck portion 42 as shown in FIG. 3. The curved center portions 57 of the clip elements 52 conform with and extends about the bead 48 at the top of the carafe 14 for firmly securing each of the spring clip elements 52 with the neck portion 42 of the carafe 14.

In the embodiment disclosed, the attachment means 50 of the decanter 10 comprises three spring clip elements 52 for securing the spout-handle 12 with the carafe 14, although the number of spring clip elements 52 may be varied according to design requirements. As seen from FIG. 2, the spring clip elements 52 are equally spaced about the ledge 40 of the carafe 14 and are received together with the upstanding ledge 40 into the annular cavity 32 of the spout-handle 12 (FIG. 3). The opening of the annular cavity 32 is dimensioned for freely receiving into it the upstanding ledge 40 of the neck portion 42 of the carafe 14 to minimize and avoid stress on the neck portion 42 of the carafe 14 with changes in temperature. To achieve this, the spacing between the outer and inner walls 34 and 36 is sufficient to avoid contact with the upstanding ledge 40 of the carafe 14. The extent to which the upstanding ledge 40 is received into the annular cavity 32 is limited by the contact made by the bottom 30 of the spout-handle 12 with the outer and inner surfaces of the carafe at respective locations 60, 62. This limits the insertion of the neck portion 40 into the cavity 32 and prevents its contact with the top wall 38 of the annular cavity 32.

The outer surface 34 of the cavity 32 is provided with one or more grooves 64 and ridges 66 while the opposite inner surface 36 may have a sloped surface 68 at its bottom with an angle such as 20 degrees to the upper vertical surface 70 to provide an enlarged entrance 39 to the annular cavity 32 which is gradually reduced in the upward direction.

The spout-handle 12 is firmly secured with the neck portion 42 of the carafe 14 by the spring clip elements 52 of the attachment means 50 as shown in FIG. 3. The legs 54, 56 of each spring clip element 52 respectively engage the inner and outer surfaces 34 and 36 of the annular cavity 32. The edge 72 at the end of each of the legs 54 of the clip elements 52 is received within a groove 64 to engage a ridge 66 in the outer surface 34, while its edge 74 at the end of the opposite leg 56 engages the surface 68 of the inner surface 36. The contact by each of the spring clip elements 52 at their edges 72, 74 prevents their dislodgment from within the annular cavity 32 and retains the center portion 57 of each of the spring clip elements 52 about the bead 48 of the carafe 14 to securely attach the spout-handle 12 with the carafe 14. The change in temperature of liquid contained with±n the carafe 14 and the dispensing of hot liquids through the spout-handle 14, which causes expansion and contraction of the carafe and/or the spout-handle 12, does not result in the application of tension on the carafe 14 by the spout-handle 12. This is because there is no direct connection between the spout-handle 12 and the carafe 14. The resilient spring clip elements 52 affords relative movement of the upstanding ledge 40 with respect to the spout-handle 12 within the annular cavity 32 due to temperature changes. Such movement is readily accommodated by the spring action of the spring clip elements 52 without exertion of undue force on either of the components.

In order to provide a liquid seal between the spout-handle 12 and the carafe 14, a resilient sealing material 80 is provided within the annular cavity 32 embedding the neck portion 42 and its upstanding ledge 40 of the carafe and the spring clip element 52 received within the annular cavity 32. Since the attachment means 50 serves to interlock the spout handle with the carafe 14 and prevent their dislodgment, the softening or distortion of the resilient sealing material 80 by the application of heat does not affect the firm and secure retention of the spout-handle 12 with the carafe 14.

Figure 4:
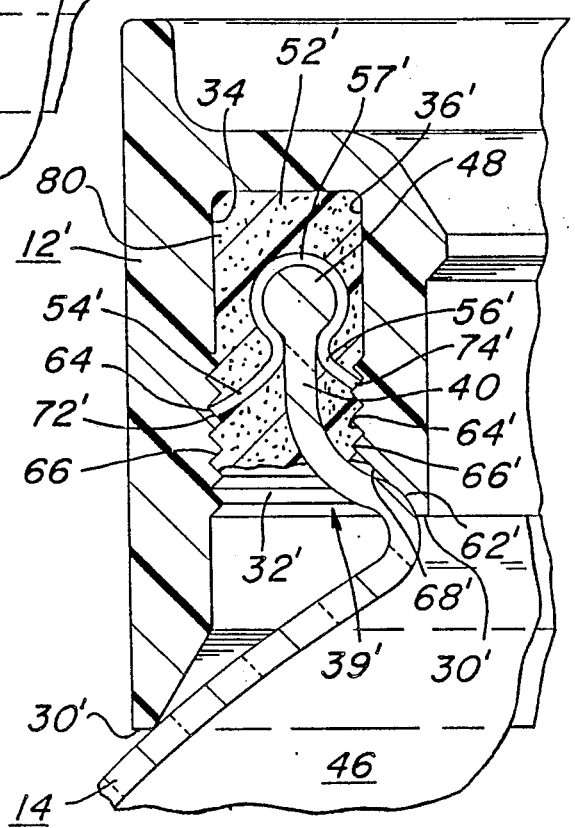
FIG. 4 is an enlarged sectional view similar to that of FIG. 3 illustrating a modified form of the decanter.

Refer to FIG. 4, a view similar to that of FIG. 3, which illustrates a modified form of spout-handle 12' of a decanter 10'. The spout-handle 12' is substantially similar to that of the spout-handle 12, except that its annular cavity 32' is provided with a series of grooves 64' at the lower portion of its surface 36' similar to the grooves and ridges 64, 66 on the opposite outer surface 34 of the cavity 32'. An angled surface 68' is also provided at the lower portion of the inner surface 36' for providing an enlarged entrance 39' to the cavity 32' and for contacting the carafe 14 at location 62 as provided for the spout-handle 12. The spring contact elements 52' are also received over the upstanding ledge 40 of the carafe 14 with its center portion 57' secured about the bead 48 and the edge 72' of their legs 54' received within a groove 64 and retained by a ridge 66 in the outer surface 34, while their other leg 56' which are shown shorter than the legs 54', have their edge 74' engage a ridge 66' of the inner surface 36' of the cavity 32'. The engagement of the legs 54' and 56' of the spring clip element 52' firmly retains same within the cavity 32' while their center portions 57' are firmly received about the bead 48 of the carafe 14, so that the carafe is firmly secured with the spout-handle 12' by means of the clip elements 52'. As described in connection with the spout-handle 12, the spring clips 52' firmly secure and interconnect the spout-handle 12' with the carafe 14, and provide for expansion and contraction of the components. The resilient sealing material 80 is also received in the cavity 32' for providing a liquid seal between the carafe 14 and the spout-handle 12'.

Refer to FIGS. 5 and 6 which illustrate a modified form of the carafe 14'. The carafe 14' is substantially similar to the carafe 14, except that the upstanding ledge 40' of its neck portion 42' is provided with positioning means 90 for each of the spring clip elements 52 of the attachment means 50. The positioning means 90, in the form illustrated, comprises a plurality of sets of pairs of projections 92, 94 extending outwardly from the outer surface 96 of the upstanding ledge 40' of the carafe 14'. A set of projections 92, 94 is provided for each of spring clip elements 52 received about the upstanding ledge 40' of the carafe 14'. The projections 92, 94 of each pair are spaced apart to receive between them and engage opposite edges 98, 100 of a leg 54 of a clip element 52 which extends proximate to the surface 96 of the ledge 40' as shown in FIGS. 5 and 6. The positioning means 90 serves to retain and locate each of the spring clip elements 52 about the neck portion 42' in spaced relationship to each other. Thus, with the spout-handle 12 or 12' securely retained with the carafe 14' by the spring clip elements 52, the positioning means 90 resists angular displacement of the spout-handle means 12, 12', about the neck 42' of the carafe 14'. The attachment means 50 provided by the spring clips 52 also prevents side to side displacement of the handle-spout 12, 12' with respect to the carafe 14 or 14' due to a heavy weight of liquid contents of the carafe when the decanter 10 or 10' is being supported by its handle 18 for the dispensing of its contents.

The method of the invention also provides for forming a decanter utilizing a glass carafe having a neck portion with an upstanding ledge and a spout-handle having an annular cavity for loosely receiving the neck portion of a carafe therein. For this purpose a plurality of spring clip elements 52 of an attachment means 50 are positioned over and are spaced about the upstanding ledge 40 as illustrated in FIGS. 2 and 5. A resilient sealing material in its fluid state is applied to the annular cavity 32 of the spout-handle 12 or the annular cavity 32' of the spout-handle 12'. Considering the spout-handle 12 and carafe 14 for purposes of description, the annular cavity of the spout-handle 12, is aligned with the upstanding ledge 40, of the carafe 14, while the spring clip elements 52 and the neck 42 of the carafe 14 are inserted into the annular cavity 32 of the spout-handle 12. With movement of the clip elements positioned over the ledge 40 of the carafe 14, into the cavity 32, through its entrance 39, the legs 54, 56 engage the outer and inner surfaces 34 and 36 of the cavity 32. In the case of the spout-handle 12, the leg 54 of each of the clip elements 52 engages the series of grooves 64 and ridges 66 while the end of the leg 56 engages the sloped portion 68 of the inner wall 36. When the ledge 40 has been fully received into the cavity 32, so that the carafe 14 contacts the bottom portion 30 of the spout-handle 12 at the locations 60 and 62, the spring clip elements 52 are seated so that their ends 54 each engage a ridge 66 while their legs 54 are tensioned by sliding along the inclined surface 68. This locks each of the clip elements 52 within the annular cavity 32 and compresses their legs 54, 56 so that the center portions 57 of the clip elements 52 firmly encompass and retain therewithin the bead 48 of the carafe 14. The fluid resilient material 80 is allowed to solidify to provide a resilient liquid seal between the spout-handle 12 and the carafe 14. Thus with the simple operation of inserting the neck of the carafe into the annular cavity provided by the spout-handle in the presence of a fluid resilient sealing material which solidifies, the decanter 10 is readily assembled using a minimum number of steps and components to provide a carafe with a spout-handle securely attached with the carafe while accommodating changes in temperature causing dimensional variations of the components which are accommodated by the resilient spring clip elements.

The method of assembling the spout-handle 12 or 12' with the carafe 14 or 14' is accomplished in the same manner described above. The spout-handle 12' has grooves and ridges along the opposite outer and inner surfaces 34', 36' of the cavity 32' for respectively engaging each of the legs 54', 56' of the clip elements 52', while the carafe 14' includes positioning means in which each of the spring elements 52 are retained in spaced positions about the upstanding ledge 40' of the carafe 14'. This method thus, also provides for assembling the decanter 10' which has its spout-handle 12' and carafe 14 or 14' firmly secured together by means of the spring elements 52'.

The invention, as described, thus provides a decanter having a spout-handle and carafe which are secured together by spring clip elements, which interconnect the neck of the carafe and the spout-handle for firmly retaining and attaching one to the other. The spring clip elements by flexing accommodate expansion and contraction of the components, as temperature varies with the heating and dispensing of hot fluids such as coffee, thus preventing the exertion of excessive force which may cause damage to the decanter. The invention also allows the rapid and efficient assembly of the components for providing the decanter.

It will, of course, be understood that the description and drawing herein are illustrative merely, and that various modifications and changes may be made in the decanter and its components without departing from the spirit of the invention.

What is claimed is:

1. A decanter with attached spout-handle comprising a glass carafe having a neck portion with an upstanding ledge providing an opening thereto, a spout-handle having an annular cavity loosely receiving the ledge of the carafe therein, a plurality of separate attachment means secured and entirely received within the cavity of the spout-handle and each extending about and engaging the ledge of the carafe for interlocking and securing the spout-handle with the carafe.

2. The decanter of claim 1 in which the plurality of attachment means comprises a plurality of spring clip elements.

3. The decanter of claim 2 in which the spring clip elements each comprises a spring metal strip having a substantially V configuration with first and second legs joined at a rounded center portion.

4. The decanter of claim 3 in which a plurality of the clip elements are positioned over the ledge of the carafe with their legs on opposite sides of the ledge and at spaced locations about the opening of the carafe.

5. The decanter of claim 4 in which the cavity of the spout-handle provides opposite surfaces and each of the legs of the spring clip elements engages an opposite respective surface for securing the spout-handle with the carafe.

6. The decanter of claim 5 in which at least one of the surfaces of the opposite surfaces of the cavity of the spout-handle is provided with a ridge, and the ends of the legs of the spring clip elements have an edge for engaging the ridge and firmly securing the clip element with the spout-handle.

7. The decanter of claim 1 in which the neck portion of the carafe is provided with positioning means for engaging and retaining each of the attachment means at predetermined locations spaced one from the other about the opening of the carafe.

8. The decanter of claim 7 in which the positioning means of the carafe comprise projecting means from the ledge of the neck portion for engaging and retaining the attachment means.

9. The decanter of claim 4 in which the neck portion of the carafe is provided with retaining means comprising a plurality of projections from the ledge each for engaging the clip elements and retaining the elements at their spaced locations about the opening of the carafe.

10. The decanter of claim 9 in which the retaining means comprises a plurality of pairs of spaced projections from the ledge of the carafe each for receiving and retaining therebetween a respective one of the clip elements for preventing its displacement and the displacement of the spout-handle about the opening of the carafe.

11. A decanter with attached spout-handle comprising a glass carafe having a neck portion with an upstanding ledge providing an opening thereto, a spout-handle having an annular cavity loosely receiving the ledge of the carafe therein, a plurality of attachment means secured within the cavity of the spout-handle and engaging the ledge of the carafe for interlocking and securing the spout-handling with the carafe about its opening, and a flexible material received within the cavity of the spout-handle for sealing the spout-handle with the carafe, the plurality of attachment means comprising a plurality of spring clip elements each including a spring metal strip having a substantially V configuration with first and second legs joined at a rounded center portion, the plurality of the clip elements being positioned over the ledge of the carafe with their legs on opposite sides of the ledge and at spaced locations about the opening of the carafe, the cavity of the spout-handle providing opposite surfaces and each of the legs of the spring clip elements engaging an opposite respective surface for securing the spout-handle with the carafe, at least one of the surfaces of the opposite surfaces of the cavity of the spout-handle being provided with a ridge, and the ends of the legs of the spring clip elements have an edge for engaging the ridge and firmly securing the clip element with the spout-handle, and the upstanding ledge of the carafe having a bead edge and the center portion of each of the spring clip elements having a curved configuration for receiving the bead edge therein, the legs of each of the spring elements being pressed together within the groove of the spout-handle securing the center portion of the spring clip elements about the bead edge of the carafe for firmly retaining same therewith and securely engaging the legs of the spring clip elements with the spout-handle.

12. The decanter of claim 11 in which at least one of the opposite surfaces of the cavity of the spout-handle has a plurality of adjacent ridges providing intermediate grooves, and an edge of a leg of each of the spring clip elements is received in an intermediate groove and engages one of said ridges to firmly secure the clip element with the spout-handle and interlocking the spout-handle with the neck of the carafe positioned and securely retained within the cavity of the spout-handle.

13. The decanter of claim 12 in which the ridges and grooves on the surface of the annular cavity of the spout-handle are provided by a plurality of adjacent annular grooves in its surface, and the plurality of ridges and grooves provide means for adjusting the position of the neck of the carafe within the annular cavity of the spout-handle.

14. The decanter of claim 13 in which each of the opposite surfaces of the cavity of the spout-handle has a plurality of adjacent annular ridges and intermediate grooves, and the edge of each of the legs of the spring clip elements is received in a groove of a respective surface and engages respective ridges for securing each of the clip elements with the spout-handle and interlocks the spout-handle with the neck of the carafe positioned and securely retained within the cavity of the spout-handle.

15. The decanter of claim 11 in which the neck portion of the carafe is provided with a plurality of pairs of spaced projections extending outwardly from the ledge of the carafe each pair of projections receiving and retaining therebetween a respective one of the clip elements at their spaced locations about the opening of the carafe and preventing their displacement and the displacement of the spout-handle about the opening of the carafe.

16. A method of forming a decanter utilizing a glass carafe having a neck portion with an upstanding ledge and a spout-handle having an annular cavity for loosely receiving the neck portion of the carafe therein, including the steps of:
(a) positioning a plurality of spring clip elements over and spaced about the upstanding ledge of the neck of a glass carafe,
(b) applying a fluid resilient sealing material within the annular cavity of a spout-handle for the glass carafe,
(c) inserting the spring clip elements while about the neck of the carafe into the annular cavity of the spout-handle and into engagement with the opposite surfaces of the annular cavity, so that the neck of the carafe is received into and positioned within the cavity and interlocked by the clip elements with the spout-handle, the resilient sealing material encompasses the neck of the carafe, and
(d) allowing the sealing material to solidify and provide a resilient liquid seal between the spout-handle and carafe.

17. The method of claim 16 in which the ledge of the neck of the carafe is provided with a plurality of spaced pairs of projections positioned about its opening, and in step (a) each of the plurality of spring clip elements is positioned between a respective pair of projections of the carafe for retaining them in position and preventing their displacement about the opening of the carafe.

* * * * *